United States Patent
Axelrod et al.

(10) Patent No.: US 9,654,335 B2
(45) Date of Patent: May 16, 2017

(54) SYSTEM AND METHOD FOR PROVISION AND MANAGEMENT OF SEGMENTED VIRTUAL NETWORKS WITHIN A PHYSICAL COMMUNICATIONS NETWORK

(71) Applicant: Hughes Network Systems, LLC, Germantown, MD (US)

(72) Inventors: Adam Axelrod, Bethesda, MD (US); Jeffrey Biber, Sterling, VA (US); David Miller, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 543 days.

(21) Appl. No.: 13/779,401

(22) Filed: Feb. 27, 2013

(65) Prior Publication Data
US 2014/0244808 A1 Aug. 28, 2014

(51) Int. Cl.
*G06F 15/16* (2006.01)
*H04B 7/212* (2006.01)
(Continued)

(52) U.S. Cl.
CPC ........ *H04L 41/042* (2013.01); *H04L 41/5041* (2013.01)

(58) Field of Classification Search
CPC ............... H04L 29/06; H04L 29/08576; H04L 29/08072; H04L 29/0809; H04L 29/06095;
(Continued)

(56) References Cited

U.S. PATENT DOCUMENTS

| 6,442,147 B1 * | 8/2002 | Mauger | H04B 7/18578 370/321 |
| 8,724,508 B2 * | 5/2014 | Chiang | H04L 41/0823 370/230.1 |

(Continued)

OTHER PUBLICATIONS

Hughes, , "HN and HX Systems Virtual Network Operator Capabilities (White Paper H39065)", http://defense.hughes.com/resources/hn-and-hx-systems-virtual-network-operator-capabilities#, Dec. 2008.
(Continued)

*Primary Examiner* — Mahran Abu Roumi
(74) *Attorney, Agent, or Firm* — Potomac Technology Law, LLC

(57) ABSTRACT

A network management method comprises configuring network domains (NDs) of a host communications network (HCN). Each ND provides a virtual network (VN) provisioned within the HCN for an enterprise customer, which forms a virtual communications subnetwork from which the enterprise customer provisions communications services. The HCN provides bandwidth over outroute and inroute channels of the HCN for the VNs. Outroute partitions are configured via outroute channels of the HCN and inroute partitions are configured via inroute channel groups configured within inroute channels of the HCN. Each outroute partition supports outroute bandwidth and each inroute partition supports inroute bandwidth. The outroute capacity partitions and the inroute capacity partitions are allocated to VNs to provide outroute and inroute capacity to the VN. Operator classifications are configured within the ND associated with the VC. Each classification specifies network operator capabilities allocated to VN operators assigned to that classification.

14 Claims, 8 Drawing Sheets

(51) Int. Cl.
*H04W 24/00* (2009.01)
*H04L 12/24* (2006.01)

(58) Field of Classification Search
CPC ... H04L 12/2697; H04B 7/212; H04B 7/2123; H04B 7/18582; H04B 7/2643; H04B 7/2656; H04W 24/00; H04W 24/08; H04W 16/18; H04W 24/06
USPC .......................................... 370/316; 709/227
See application file for complete search history.

(56) References Cited

U.S. PATENT DOCUMENTS

| | | | | |
|---|---|---|---|---|
| 2008/0262997 | A1* | 10/2008 | Furusho | G06F 17/30955 |
| 2009/0129310 | A1* | 5/2009 | Bruemmer | H04B 7/18513 370/316 |
| 2010/0189019 | A1* | 7/2010 | Belfort | H04W 8/02 370/310 |
| 2010/0329118 | A1* | 12/2010 | Adams | H04L 47/10 370/235 |
| 2013/0189974 | A1* | 7/2013 | Damola | H04B 1/74 455/423 |

OTHER PUBLICATIONS

Hughes, , "HX ExpertNMS (H42163)", http://www.hughes.com/ProductsAndTechnology/BroadbandSatelliteSystems/HXSystem/HXExpertNMS/Documents/HX-ExpertNMS__A4__H42163__HR.pdf, Mar. 2010.

Hughes, , "HX System 4.0 (White Paper H47735)", http://www.hughes.com/ProductsAndTechnology/BroadbandSatelliteSystems/HXSystem/Documents/HXSys40__H47735__HR.pdf, Feb. 2012.

Hughes, , "HX System Virtual Network Operator Capabilities (White Paper H47215)", http://www.hughes.com/ HNS%20Library% 20Presentations%20and%20White%20Papers/HX-VNO__H47215__HR.pdf, Mar. 2012.

IDIRECT, , "Virtual Network Operator (VNO) Program Technology Brief", http://www.constellationnetcorp.com/Downloads/Spec%20Sheets/iDirect/iDirect__Virtual__Network__Operator__VNO.pdf, (pub-date unkown).

* cited by examiner

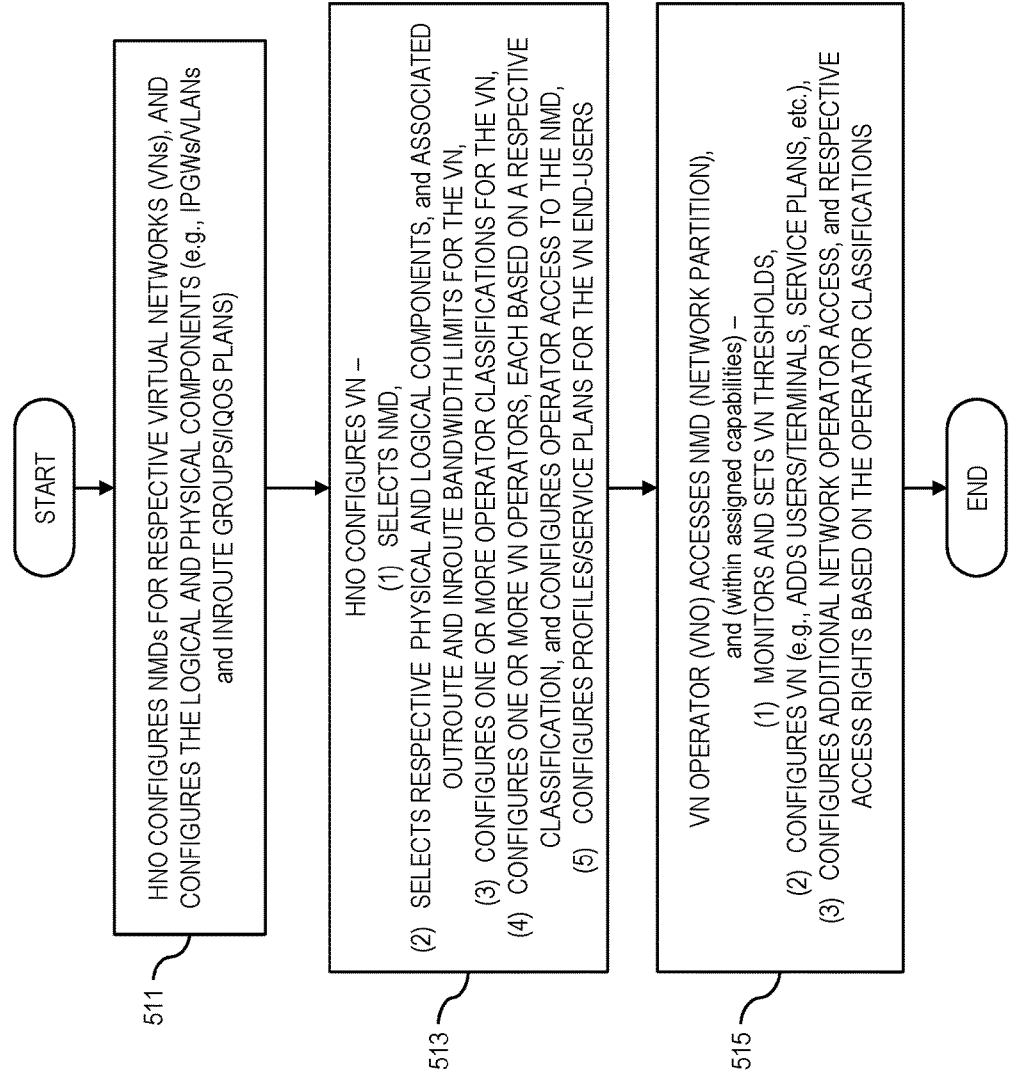

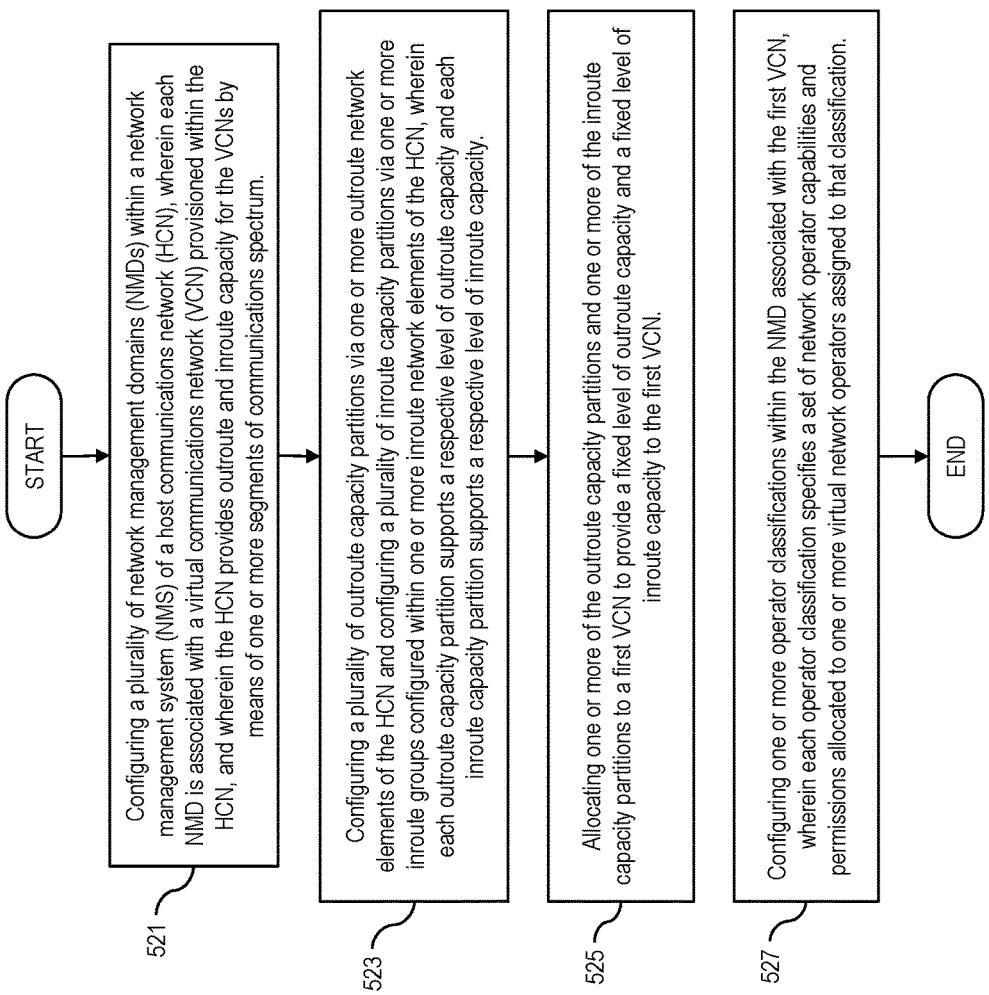

SYSTEM AND METHOD FOR PROVISION AND MANAGEMENT OF SEGMENTED VIRTUAL NETWORKS WITHIN A PHYSICAL COMMUNICATIONS NETWORK

BACKGROUND

The overall capacities of broadband satellites and computer networks are increasing exponentially, and such capacity increases present unique challenges in the associated transmission systems and network designs. The goal of the system designers, system operators, and service providers is to support and provide efficient, robust, reliable and flexible services, in a shared bandwidth network environment, utilizing such high capacity satellite systems or computer networks. Further, with respect to system operation it is desirable to support multi-tiered sales structured. For example a system owner may wish to set up a sales structure for the resale of network services that comprises resellers, who ultimately resell network capacity and services to end-users.

Furthermore, as the global networks have become more complex, an emerging field of telecommunications logistics providers has arisen. Such logistics providers deliver network management services for large communications networks that may span across multiple carriers, via their own networks and supporting infrastructure. The provision of such services via separately-owned networks and infrastructure, however, introduces a significant amount of cost, effort and complexity that is involved in the setup and maintenance of such networks and supporting infrastructure. Historically, network configurations were provided for each customer via a network management domain, which typically comprise a categorization or isolation of configurations pertaining to a particular customer. Within the network management domain, profiles are configured for respective end-user types, and when the network operator accesses the network management domain he accesses those particular configurations and profiles for providing communications services to customers. These network management domains, however, strictly dealt with configurations within the network, and lacked any provision for application of bandwidth limitations and the allocation of bandwidth with respect to a particular VAR. Such network management domain configurations also lacked any ability to provide the network operator control over a network of partitioned and dedicated bandwidth, such as configuration, management and operational capabilities, and monitoring and maintenance functionality, with respect to the operator's network and associated bandwidth. Network management domains lacked a true capability and access control framework to support a flexible reseller regime, but instead only facilitated a limited set of access control based on high levels of functionality and failed to accurately or precisely segregate or isolate bandwidth. Accordingly, the VAR was required to rely on the host network operator for all such operational control over the network, and for pre-configuration of the end-user service plans and applications to be supported by the network.

The changing marketplace and increasing demand for Internet connectivity have thus forced carriers to implement and operate "virtual" networks as a normal part of doing business globally. For example, a Virtual Network Operator (VNO) is a provider of management services and a reseller of network services purchased from communications service network owners and wholesalers. The VNO typically does not own the network communications infrastructure utilized for the supply of communications network services. Instead, such providers deliver network services to customers without owning the underlying network, and hence are categorized as "virtual network operators." The VNO typically leases bandwidth at the wholesale rates from various telecom providers, and resells communications services (based on the wholesale capacity) via a virtual network. Moreover, a fully virtual VNO does not have any technical facilities or technical support, and instead relies on support delivered by infrastructure providers.

Accordingly, the need for VNO capabilities is becoming an ever increasing necessity in order to compete in the growing global network communications services marketplace. For example, satellite service providers are offering new service packages for second tier providers who in turn repackage these services for sale to their end-user customers. Further, such second tier providers now desire more control over their purchased satellite services, and desire to manage the purchased resources with minimal support from the system operators. With a robust VNO capability, therefore, satellite operators can meet such current requirements of second tier providers (and further tier customers), selectively providing resources, operations and network management tools of the primary network to such sub tier providers and customers.

Such multi-tiered sales structures, however, present various system design and operational challenges. Such challenges, for example, include the provision of an effective partition of network resources into controlled segregated subsets, and the provision of a rich and extensible reseller capability set, supporting a feature-rich and user-friendly network interface. Further challenges include, the facilitation of a clear delineation between host operator and reseller roles, to clearly delineate the network management roles between the host network operator and the reseller or virtual network operator, in a manner whereby a host network operator can provide segregated bandwidth to respective virtual networks and allow the respective virtual network operators to have full control over the ultimate services and applications provided to their end-user clients.

What is needed, therefore, is a robust and feature-rich virtual network operator (VNO) capability, which provides network operators with full management control over respective virtual network services (with minimal support from the host system operators), via efficient segregation of the VNO network from the primary system operations and selective provision of resource, operations and network management tools to the VNO.

SOME EXEMPLARY EMBODIMENTS

The present invention advantageously addresses the needs above, as well as other needs, by providing a robust and feature-rich virtual network operator (VNO) capability, which provides more management control over the virtual network services with minimal support from the system operators, via efficient segregation of the VNO network within the primary system operations and selective provision of resource, operations and network management tools to the VNO.

In accordance with exemplary embodiments, a method comprises configuring a plurality of network management domains (NMDs) within a network management system (NMS) of a host communications network (HCN). Each NMD is associated with a virtual communications network (VCN) provisioned within the HCN, and the HCN provides outroute and inroute capacity for the VCNs by means of one or more segments of communications spectrum. The method further comprises configuring a plurality of outroute capacity partitions via one or more outroute network elements of the HCN, and configuring a plurality of inroute capacity partitions via one or more inroute groups configured within one or more inroute network elements of the HCN. Each outroute capacity partition supports a respective level of outroute capacity and each inroute capacity partition supports a respective level of inroute capacity. One or more of the outroute capacity partitions and one or more of the inroute capacity partitions are allocated to a first VCN to provide a fixed level of outroute capacity and a fixed level of inroute capacity to the first VCN. One or more operator classifications are configured within the NMD associated with the first VCN, wherein each operator classification specifies a set of network operator capabilities and permissions allocated to one or more virtual network operators assigned to that classification. According to a further exemplary embodiment, at least one of the operator classifications comprises predetermined levels of configuration control, operational/management control, monitoring capabilities, and troubleshooting/maintenance capabilities allocated to the one or more virtual network operators assigned to that classification.

In accordance with further exemplary embodiments, a communications system comprises a network management system (NMS) configured to manage a plurality of network management domains (NMDs) configured within the NMS. Each NMD is associated with a virtual communications network (VCN) provisioned within a host communications network (HCN), and wherein the HCN provides outroute and inroute capacity for the VCNs by means of one or more segments of communications spectrum. The system further comprises one or more outroute network elements within which a plurality of outroute capacity partitions are configured, wherein each outroute capacity partition supports a respective level of outroute capacity of the HCN. The system also comprises one or more inroute network elements within one or more inroute groups are configured to provide a plurality of respective inroute capacity partitions, wherein each inroute capacity partition supports a respective level of inroute capacity of the HCN. Further, one or more of the outroute capacity partitions and one or more of the inroute capacity partitions are allocated to a first VCN to provide a fixed level of outroute capacity and a fixed level of inroute capacity to the first VCN. Additionally, one or more operator classifications are configured within the NMD associated with the first VCN, wherein each operator classification specifies a set of network operator capabilities and permissions allocated to one or more virtual network operators assigned to that classification. According to a further exemplary embodiment, at least one of the operator classifications comprises predetermined levels of configuration control, operational/management control, monitoring capabilities, and troubleshooting/maintenance capabilities allocated to the one or more virtual network operators assigned to that classification.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A illustrates a flow chart depicting a process for configuring and providing VNO capabilities and functionality, in accordance with exemplary embodiments of the present invention;

FIG. 5B illustrates a flow chart depicting a further process for configuring and providing VNO capabilities and functionality, in accordance with exemplary embodiments of the present invention.

DETAILED DESCRIPTION

In accordance with aspects of the present invention, systems and methods for providing a robust and feature-rich virtual network operator (VNO) capability, which delivers more management control over the virtual network services with minimal support from the system operators, via efficient segregation of the VNO network from the primary system operations and selective provision of resource, operations and network management tools to the VNO, are described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

Figure 1A:
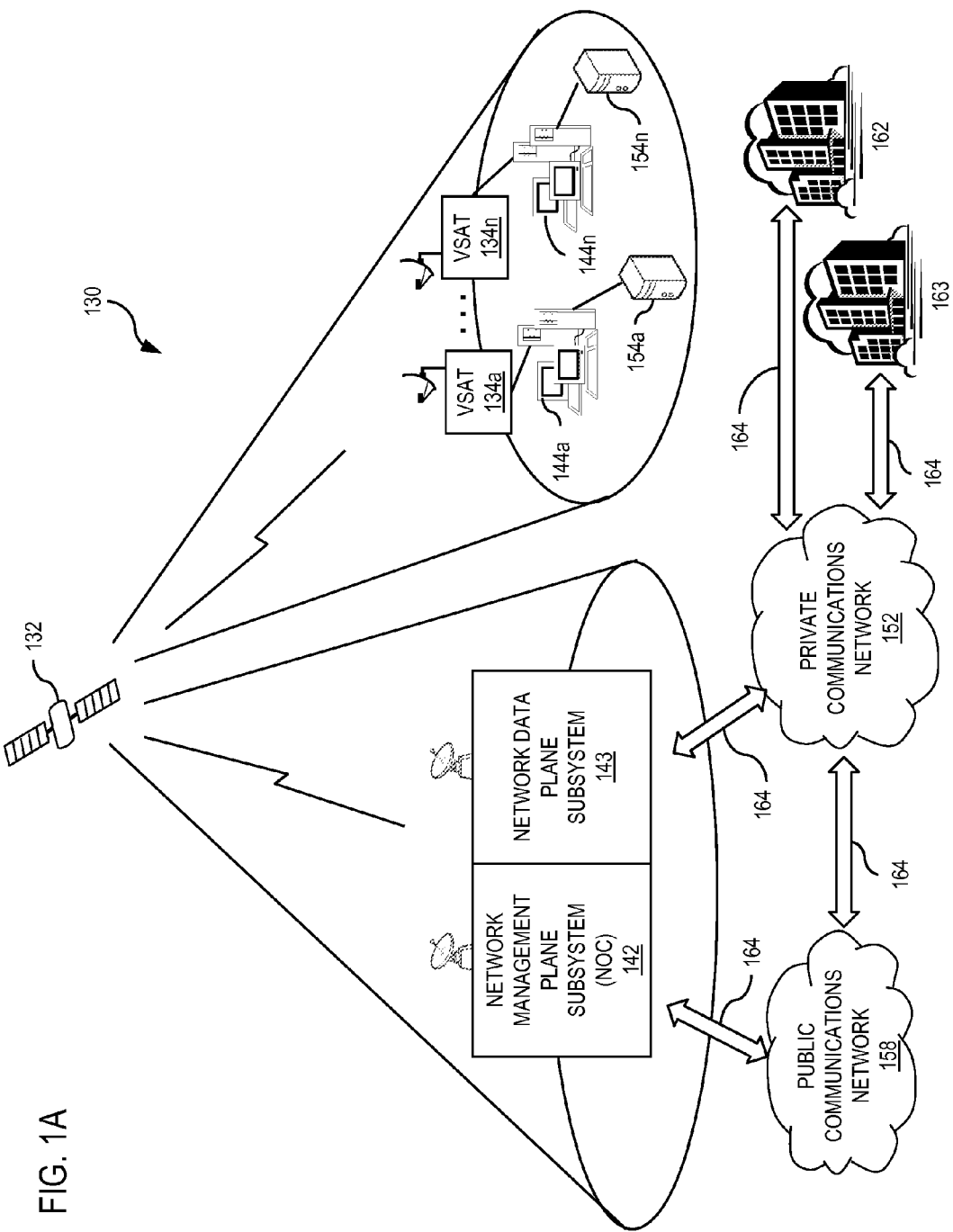
FIG. 1A illustrates a communications system capable of employing a robust and feature-rich virtual network operator (VNO) capability, in accordance with exemplary embodiments of the present invention.
Figure 1B:
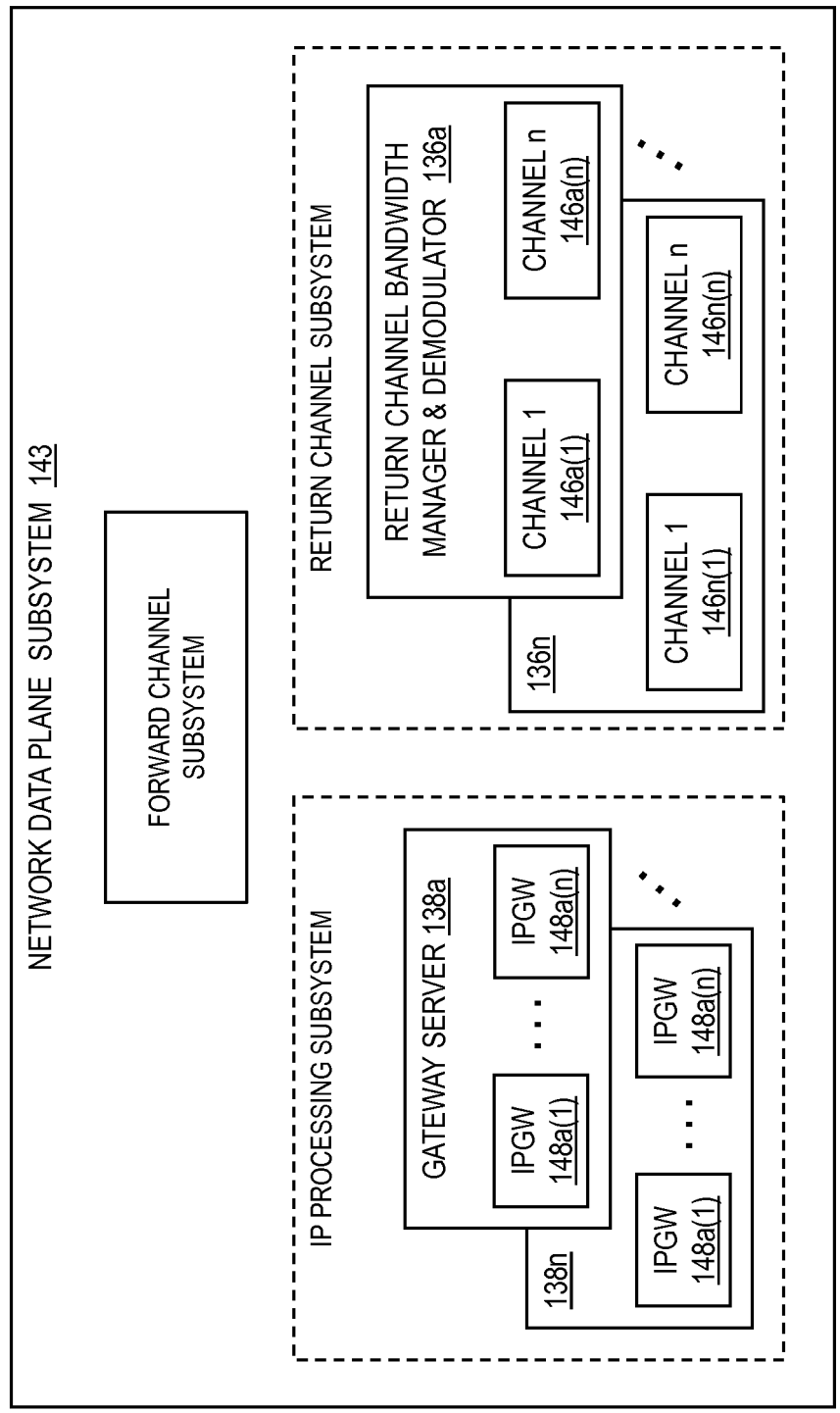
FIG. 1B illustrates a block diagram of the network data plane subsystem of FIG. 1A, in accordance with exemplary embodiments of the present invention.

FIG. 1A illustrates an exemplary communications system capable of employing a robust and feature-rich virtual network operator (VNO) capability, and FIG. 1B illustrates a block diagram of the network data plane subsystem of FIG. 1A, in accordance with exemplary embodiments of the present invention. With reference to FIG. 1A an exemplary satellite communications system 130, is depicted. Satellite communications system 130 includes a satellite 132 that supports communications among multiple satellite terminals (VSATs) 134a-134n, a network data plane subsystem 143, and a network management plane subsystem 142 or network operations center (NOC). The NOC performs the management plane functions of the system, while the GWs perform the data plane functions of the system. For example, the NOC can perform such functions as network management and configuration, software downloads (e.g., to the VSATs 134a-134n), status monitoring, statistics functions (e.g., collection, aggregation and reporting), security functions (e.g., key generation, management and distribution), VSAT registration and authentication, and GW management. The NOC can communicate with each GW via the satellite, or via a secure private communications network 152 (e.g., an IPsec tunnel over a dedicated link or a virtual private network (VPN) or IPsec tunnel through a public network, such as the Internet). Additionally, each gateway and the NOC can have connectivity to one or more public communications networks 158, such as the Internet or a PSTN. According to different embodiments, for example, the GWs may be co-located with the NOC (e.g., in the case of a broad-beam satellite system—as depicted in FIG. 1A) or may be geographically distributed within different beams of the satellite 132 (e.g., in the case of a spot-beam satellite system).

With reference to FIG. 1B, according to a further exemplary embodiment, the network data plane subsystem 143 comprises a forward channel subsystem, an IP processing subsystem, and a return channel subsystem. The IP processing subsystem comprises a number of gateway servers 138a-138n. Each of the gateway servers 138a-138n, may further include one or more IP gateway (IPGW) instances—whereby the data plane functions are allocated amongst the gateway server and its respective IPGW instances. For example, gateway server 138a can include IPGWs 148a(1)-148a(n). An gateway server and/or its respective IPGW instances can perform such functions as outroute coding and modulation (e.g., DVB-S2 adaptive coding and modulation), outroute prioritization, flow control, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. The VSATs 134a-134n can provide connectivity to one or more hosts 144a-144n and/or routers 154a-154n, respectively. The satellite communications system 130 can operate as a bent-pipe system, where the satellite essentially operates as a repeater or bent pipe. Alternatively, the system can employ a switching or processing satellite supporting mesh communications (point-to-point communications directly between, for example, the two VSATs 134a and 134n).

In a bent-pipe system of an exemplary embodiment, the satellite operates as a repeater (or bent pipe), and communications to and from the VSATs are transmitted over the satellite to and from respective IPGWs associated with particular VSATs. Further, in a spot beam system, any one spot beam operates as a bent-pipe to a geographic region covered by the beam. For example, each spot beam operates as a bent pipe communications channel to and from the VSATs and/or IPGW(s) within the geographic region covered by the beam. According to one embodiment, several GWs/IPGWs are distributed across the geographic region covered by all spot beams of the satellite, where, in a beam in which a GW (and respective IPGWs) are located, only the one GW (and no VSATs) occupies that beam. Further, each IPGW can serve as an aggregation node for a multitude of remote nodes or VSATs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the VSATs), or locations of available terrestrial data centers (e.g., terrestrial data trunks for access to public and private dedicated networks). Further, an additional supported capability/feature would be oversubscription, whereby the IPGWs service a level of subscribed bandwidth that exceeds the respective outroute capacity. In the case of oversubscription, the host network operator manages the risk of outroute overload based on link budget and network traffic loading over time (e.g., based on historical statistics and/or traffic load models). Alternatively, in a communications system that employs a processing satellite (e.g., including a packet switch operating, for example, at a data link layer), the system can support direct unicast (point-to-point) communications and multicast communications among the VSATs and GWs. In the case of a processing satellite, the satellite decodes the received signal and determines the destination VSAT or VSATs and/or GWs. The satellite then addresses the data accordingly, encodes and modulates it, and transmits the modulated signal to the destination VSAT or VSATs (e.g., VSAT 134n) and/or GWs (and their respective IPGWs). According to exemplary embodiments, the system thereby provides a fully meshed architecture, whereby the VSATs 134a-134n can directly communicate, via a single hop, over the satellite.

For example, with respect to a data communications from VSAT 134a to a public communications network 158 (e.g., the Internet), the VSAT 134a can be associated with an IPGW (e.g., IPGW 148a(1)). The data is first transmitted, via the satellite 132, from the VSAT 134a to associated IPGW 148a(1). The IPGW 148a(1) determines the destination as being the Internet 158. The IPGW then repackages the data (e.g., as a TCP/IP communications), and routes the data communications, via the terrestrial link 164, to the Internet 158. Further, in the case of an enterprise customer 162 corporate network, for example, a corporation can deploy various remote VSATs at remote offices. More specifically, VSAT 134n, located at a remote corporate location, can securely communicate with the corporate headquarters 162 (e.g., an enterprise customer or reseller). Accordingly, for a data communications from VSAT 134n to the corporate headquarters 162, the data is first transmitted, via the satellite 132, from the VSAT 134n to an IPGW associated with the VSAT 134n (e.g., IPGW 148a(27)). The IPGW 148a(27) determines the destination as being the corporate headquarters 162. The IPGW then repackages the data (e.g., as an IPsec communications), and routes the IPsec data communications, via the terrestrial links 164 (over the private network 152), to the corporate headquarters 162, where the terrestrial links 164 may comprise secure links. In the corporate network scenario, a further example can involve a corporate communications from the corporate headquarters to a number of remote sites (e.g., a multicast communications to VSATs 134a-134n)—where VSATs 134a-134n are correspondingly associated with the two IPGWs 148a(1) and 148a(27) (e.g., grouped between the two IPGWs based on load balancing and IPGW capabilities). In this scenario, a gateway or router, within the local network of corporate headquarters 162, transmits the data communications, via the terrestrial links 164 (over the private network 152), to the IPGWs 148a(1) and 148a(27). The IPGWs determine that the communications is destined for the remote VSATs 134a-

134n, and package the data as a multicast communications addressed to the community of VSATs 134a-134n. The IPGWs then transmit the data communications, via the satellite 132, for decoding by the community of VSATs 134a-134n. Accordingly, the satellite 132 of such a system acts as a bent pipe or repeater, transmitting communications between the VSATs 134a-134n and their respective associated IPGWs 148a-148n.

With further reference to FIG. 1A and FIG. 1B, in accordance with exemplary embodiments of the present invention, segments or partitions of system resources and associated communications services can be provisioned by the host network operator (HNO) 165 for one or more value added reseller (VAR) customers 163, via VNO features/functionality of the communications network 130. For example, such VNO functionality may be integrated or deployed via the NOC 142, and accessed by the VAR customer(s) via the private communications network 152 and/or the public communications network 158 (over the terrestrial links 164, one or more of which may comprise secure links, such as VPN tunnels and/or IPSEC links). The VNO functionality the establishment of multiple independent virtual networks, whereby, once configured, multiple VNO customers are each capable of independently accessing a respective virtual network to provide communication services to customers of the VNO, without requiring the purchase and deployment of network infrastructure for the establishment and operation of the VNOs. According to one exemplary embodiment, the HNO 165 configures respective virtual networks for multiple VNO customers, each with its own unique allocation of resources. As part of the configuration, a set of resources is allocated to a virtual network, and the HNO is able to set up different user classifications for VNO operators (e.g., different operator capabilities/permissions by operator class). In one example, each operator classification may include a full set of access rights (both functional and modular capabilities), which can be assigned to the respective operator type. Accordingly, via such VNO functionality, the VNO need not make significant investments in infrastructure or bandwidth (e.g., satellite space segment), but instead, is able to rely on the service provider or HNO to make such investments and provide the requisite communications service types through a virtual network configuration. In turn, the HNO is able to resell network resources/services, via a single system infrastructure, to multiple VNOs, thereby talking advantage of economies of scale.

More specifically, in accordance with exemplary embodiments, a virtual network is set up by assigning specific bandwidth resources to the network. According to one embodiment, one or more virtual networks are set up on a shared basis, whereby the spectrum (e.g., in megasymbols) is not physically divided, but rather is assigned as portions allocated in megabits (e.g., an individual Mbps portions of the overall spectrum is respectively assigned to each virtual network). On a network component level, the physical network elements (e.g., an outroute IPGW managed via a single network control server, and an inroute group managed via a return channel bandwidth manager and respective return channel demodulator) are shared amongst multiple virtual networks (VNOs) configured as a shared network model. Alternatively, according to a further embodiment, a virtual network is configured and assigned on a dedicated basis, whereby a portion of spectrum (Msps) is dedicated to a VNO (e.g., one or more entire outroutes and one or more inroute groups are allocated to a VNO—the respective outroute IPGW(s) and one or more inroute groups via the respective return channel bandwidth manager(s) and return channel demodulator(s) are dedicated to the VNO). The VNO is then able to divide the allocated outroute spectrum into its own Mpbs portions and divide the allocated inroute group(s) into its own individual IQOS plans to suit is business purposes. These concepts of dedicated versus shared network models will be discussed in further detail below. In either case, however, the virtual network bandwidth is defectively partitioned within the overall host network and allocated to respective virtual networks via the assignment of inroute and outroute bandwidth—e.g., either on a spectrum basis in the case of a dedicated model and on a Mbps basis (supported by the host network spectrum).

In the case of a shared virtual network, dedicated bandwidth is isolated to each virtual network, whereby the physical system spectrum supports a number of individual VNO allocations via respective IPGW instances deployed on a single gateway server that controls the allocated bandwidth and controls the individual network configurations for each virtual network. In other words, the spectrum is partitioned and respectively allocated to individual virtual networks via shared network management hardware and software, which achieves improved network operational and management efficiencies, as opposed to prior solutions where each network required dedicated hardware and software resources for the management and operation of an individual network. In the case of a dedicated virtual network, system spectrum is dedicated to the network and the network operator (VNO) configures bandwidth pools (Mbps pools) via IPGW instances (outroute) deployed on gateway server(s) dedicated to the virtual network, and IQOS plans (inroute) deployed within inroute group(s) dedicated to the virtual network. Accordingly, in either case, the specific spectrum or bandwidth is allocated to a network with respective access rights granted to the respective VNO.

Further, with the VNO functionality in accordance with exemplary embodiments, certain role-based and modular based capabilities are provided. For example, with respect to role-based capabilities, within a virtual network the operator has access to certain capabilities associated with the operation of the network. Such role-based capabilities may include network configuration, network control, network monitoring, network troubleshooting, etc., all within the confines of the virtual network partition. Moreover, the capabilities may be service-oriented, and centered on the applicable network management functionality required by a respective VNO. Also, depending on the role of a user or operator, certain of these role-based capabilities may be restricted, for example, to read-only or limited levels of configuration or operation—within the levels of configuration some things may be read-only, and others may be full configuration or some modified level of configuration capabilities. Modular based capabilities, for example, may comprise certain application modules available to the VNO based on the operators subscription level. Such application modules, for example, include a configuration dashboard application that provides a graphical user interface for the configuration capabilities available to the network operator, a map view that provides a geographical illustration of the locations of all user terminals within a VNO's network, and troubleshooting and diagnostics applications. Such module based capabilities thus are not based on roles but rather subscription levels of the virtual network. Accordingly, the VNO functionality provides for full network management capabilities at the VNO level (e.g., VAR level), within the virtual network partition (whereby the VNO may only access the bandwidth allocated to its virtual network with respect to operations monitoring and other management functions). With respect to terminal or end-user types or classes, according to exemplary embodiments, the HNO may configure different end-user types or classes and assign different combinations of such end-user types or classes to a virtual network (e.g., for use by the VNO as a template for creating subscribed end-users). For example, such end-user types or classes may be configured based on the requirements of the particular virtual network, as requested by the network operator or customer. The VNO may then draw from the assigned end-user classes for its end-user customers, for example, based on service level subscribed to by a particular end-user customer.

In accordance with further exemplary embodiments, the VNO functionality provides for over subscription at different levels. At a first level, between the HNO and the VNO, the HNO can oversubscribe the outroute, whereby within the given allocated spectrum, multiple IPGW instances can be created. More specifically, the host network operator may oversubscribe outbound bandwidth based on pre-calculated contention ratios. During peak load periods, where the amount of traffic being offered by all IPGWs or VLAN instances is greater than the outroute capacity, the satellite gateway provides flow control feedback to the IPGWs, allowing them to slowly reduce how much outbound traffic they are forwarding. When the offered load goes down, the IPGWs increase their rate back toward their individual maximum configured value. In addition to oversubscribing the total configured committed information rate traffic from all of the IPGWs, it is also possible for a VNO to oversubscribe the total bandwidth available to the individual end-users within an IPGW.

Accordingly, for example, a 10 megasymbol outroute is capable of supporting a certain level of megabits per second (which may be dynamic depending on certain factors such as ACM distribution, the HNO's overall link budget, etc.—but typically is more optimum than the lowest ACM modulation/code rate but not as high as the highest ACM modulation/code rate). So, if that 10 mega symbol out route can produce 50 Mbps, for example, the HNO may oversubscribe that outroute at 60 Mb, banking on such factors as peak time usage and bandwidth allocations. In that regard, the HNO is able to sell bandwidth at the non-compressed level. In other words, given a certain level of megabits performance based on compression, a higher level of capacity may be supported on a practical level, then it is that higher level of capacity that can be sold or apportioned to a virtual network. Similarly, on the inroute side (inroute quality of service or IQOS), a number of different IQOS plans can be configured within an inroute group. On the VNO level, the virtual network is apportioned a certain level of bandwidth or capacity, and the VNO may oversubscribe the apportioned bandwidth amongst the end-user customers, again taking advantage of traffic modeling and peak and nonpeak usage levels. The VNO functionality thereby facilitates the optimization of megabits over megasymbols (or megahertz). In this regard the system enables the optimization of a portion of spectrum to maximize the level of bandwidth (in megabits) available to a virtual network.

Figure 2:
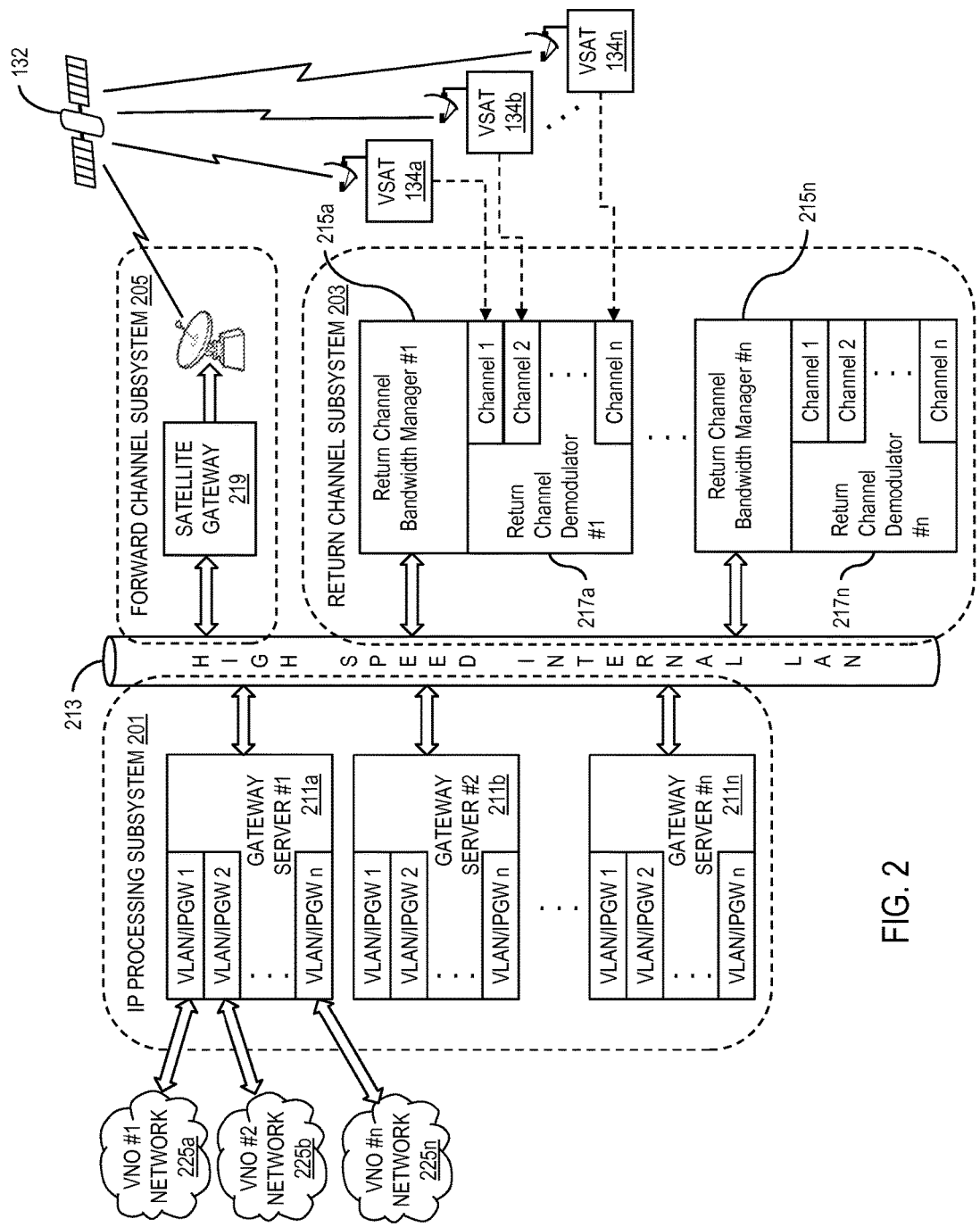
FIG. 2 illustrates a block diagram depicting the physical resources utilized for providing virtual networks and virtual network operator (VNO) capabilities, according to exemplary embodiments of the present invention.
Figure 3:
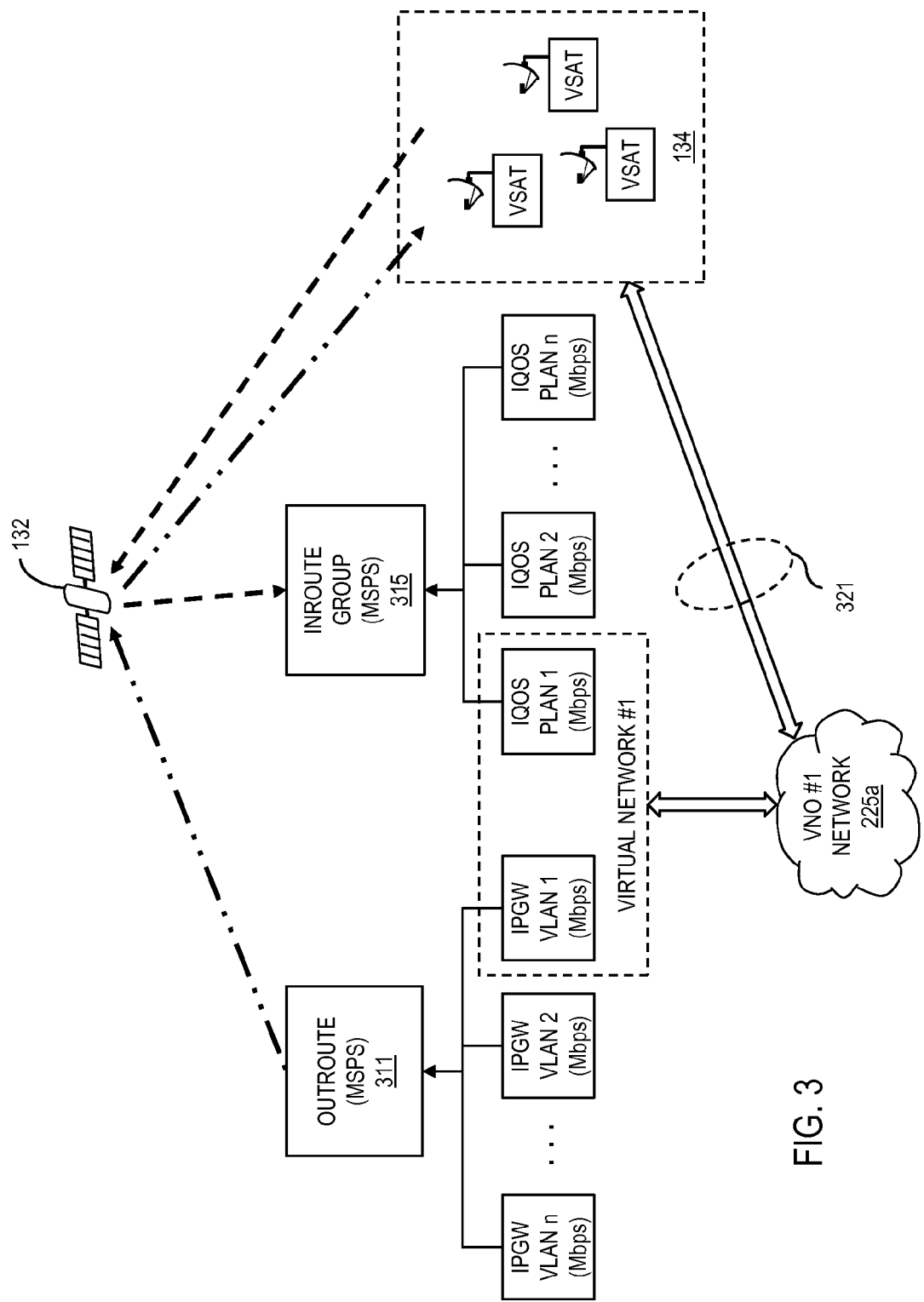
FIG. 3 illustrates a block diagram depicting the configuration of a virtual network, on an outroute and inroute basis, according to exemplary embodiments of the present invention.

FIG. 2 illustrates a block diagram of the physical resources utilized for providing VNO capabilities, according to exemplary embodiments of the present invention. Further, FIG. 3 illustrates a block diagram depicting the configuration of a virtual network, on an outroute and inroute basis, according to exemplary embodiments of the present invention. With reference to FIG. 2, the physical resources that support the virtual network configurations comprise the IP Processing Subsystem 201, the Forward Channel Subsystem 205, and the Return Channel Subsystem 203, all interfaced together via the high-speed internal LAN 213. The IP Processing Subsystem comprises a number of gateway servers 211a-211n. In a shared network model, on the outroute side, a number of virtual networks are provisioned on a single shared gateway server 211. Capacity is allocated to each virtual network via IPGW instances or VLANs configured within the shared gateway server 211, and the virtual networks of the various VNOs sharing a single gateway server are segregated via the respective VLAN instances. For example, the establishment of a virtual network comprises the partitioning of the physical communications system resources. In the case of a dedicated network, physical hardware resources must first be set up and configured. Alternatively, in the case of a shared network, system resources are partitioned based on IPGW/VLAN instances within a gateway server 211a-211n. At the system resource level, a desired capacity (e.g., in megabits) is allocated to the virtual network. According to one exemplary embodiment, for the outbound bandwidth, the IPGW or VLAN instance can be configured with a maximum committed information rate (CIR), which limits the maximum throughput at which the IPGW is allowed to transmit data. This maximum CIR is configured by the host network service provider based on the overall bandwidth subscription agreement with the VNO.

With reference to FIG. 3, at a broader level, each gateway server 211 represents an outroute 311 that supports a portion of spectrum or bandwidth in megasymbols (or megahertz), and, based on various factors including the employed modulation and coding schemes and distributions, the portion of spectrum supported by the gateway server provides for a certain bandwidth level in megabits. The provided bandwidth level can then be partitioned to support a number of virtual networks (e.g., virtual network #1), where each such virtual network is supported by a respective IPGW or VLAN instance (e.g., VLAN 1). In that regard, each virtual network is allocated a certain level of bandwidth (in megabits), supported by a dedicated IPGW/VLAN instance within the overall outroute 311 (e.g., gateway server 211). For example, with reference to FIG. 3, VLAN 1 of virtual network #1 may comprise a maximum throughput of 5 Mbps of downlink capacity. A particular VLAN instance (e.g., VLAN 1 of IPGW #1) in turn communicates with a wide area network 225a associated with the VNO customer (e.g., VNO #1) to which that virtual network is provided (supported by VLAN 1). On the other hand, in the case of a dedicated virtual network model (not shown), an entire gateway server would be dedicated to a single VNO. That VNO may then partition the dedicated gateway server into multiple VLAN instances controlling multiple virtual networks of that one VNO. Accordingly, the host network level, the HNO manages and operates with bulk bandwidth or spectrum, while at the virtual network level, the VNO deals with constrained bandwidth in the context of service levels and service agreements.

Referring again to FIG. 2, the Return Channel Subsystem 203 comprises a number of respective return channel bandwidth manager/return channel demodulator pairs 215a/217a to 215n/217n. Each return channel demodulator 217 provides the physical inroute channels through which the remote satellite terminals 134 of the respective VNOs communicate. With reference to FIG. 3 (similar to the gateway servers of the outroute side), each return channel bandwidth manager/return channel demodulator pair supports a level of inroute spectrum or capacity (in megasymbols or megahertz), which comprises one or more inroute groups 315. The inroute spectrum of a given return channel bandwidth manager/return channel demodulator pair in turn translates into a level of bandwidth in megabits. The level of bandwidth in megabits is then partitioned into a number of inroute quality of service (IQOS) plans (e.g., IQOS 1, IQOS 2, . . . , IQOS n), which provide the respective inroute capacity to the individual virtual networks. The physical inroutes are configured within the respective return channel demodulator's 217, where the received transmission signals are demodulated. On the logical level, within a particular return channel bandwidth manager 215, the inroute spectrum comprises one or more inroute groups, where each inroute group may be of a different symbol rate. Each inroute group, in turn, is partitioned into the individual IQOS plans for dedicating bandwidth to respective virtual networks. For example, with reference to FIG. 3, IQOS 1 of virtual network #1 may comprise a maximum throughput of 2 Mbps of uplink capacity.

In other words, the received data transmissions are first demodulated by a respective return channel demodulator 217 based on the respective channels (e.g., frequencies) of the transmissions. Once demodulated, the received data is handled based on the respective IQOS plans, which are administered and managed by the respective return channel bandwidth manager 215. Accordingly, on the inroute side, in the case of a shared network model, multiple virtual networks share the resources of a respective return channel bandwidth manager 215/return channel demodulator 217 pair. In the case of a dedicated network model, on the inroute side, an entire return channel bandwidth manager/return channel demodulator pair may be dedicated to a single VNO and again that VNO may configure the respective capacity of that return channel bandwidth manager/return channel demodulator pair as a number of IQOS plans to meet the network needs of that VNO.

Moreover, in the context of the network management domain (NMD), such VNO capabilities and functionality afford the wholesale operator or host network operator with the capability to provide to each of the multiple VNOs with partitioned access to the network management system (NMS). In that regard, each VNO is provided access to the NMS for the configuration, operation, control, monitoring and maintenance of its own network elements (IPGWs, remote terminals, and if applicable, return channel bandwidth manager and demodulator elements), but at the same time is also prohibited from accessing components associated with other VNO networks. Additionally, each VNO is provided access to monitor the status of the common network elements or equipment, while at the same time is restricted from configuration and control of such common elements. The configuration, control and maintenance of the common network elements remains the responsibility of the HNO.

Figure 4:
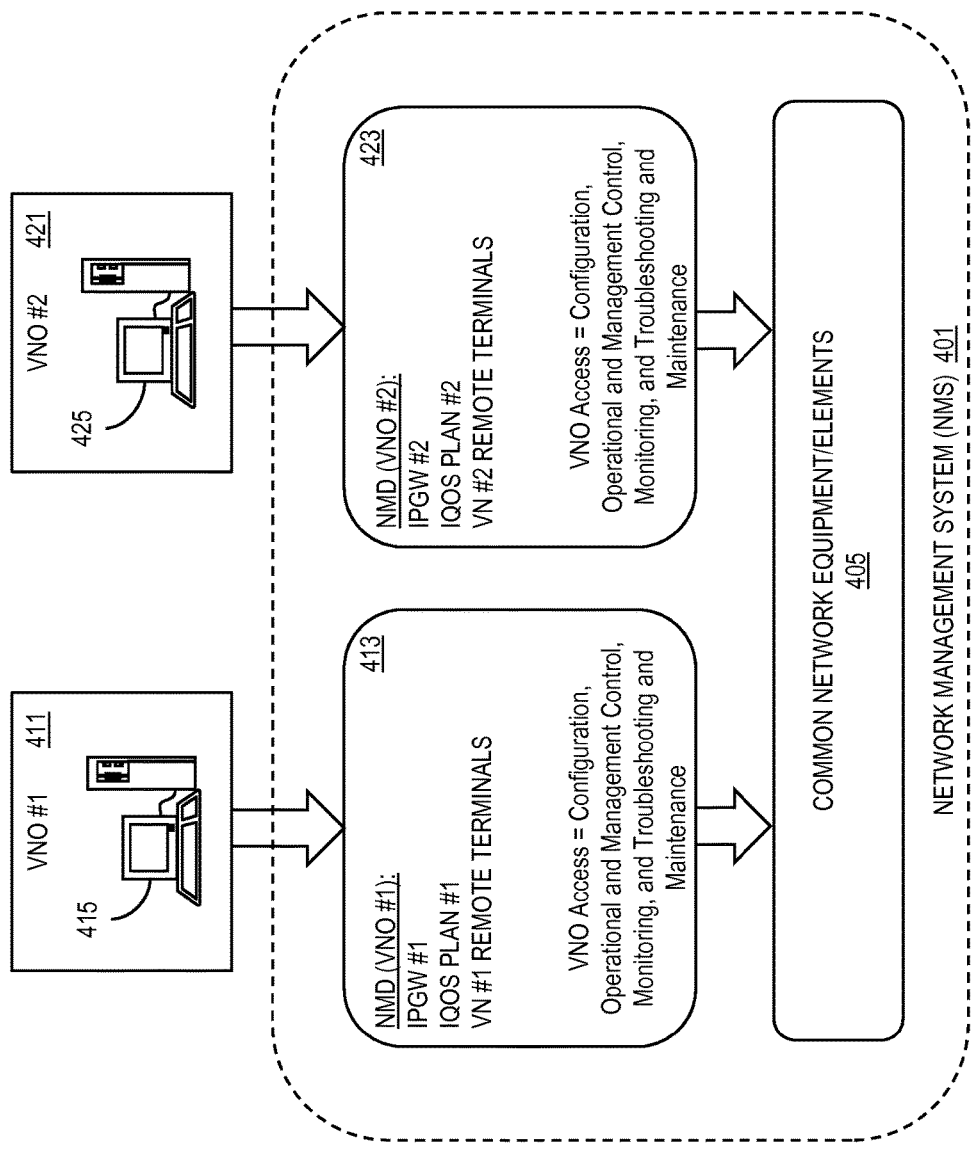
FIG. 4 illustrates a block diagram depicting the virtual network operator (VNO) capabilities within the network management domain, according to exemplary embodiments of the present invention.

FIG. 4 illustrates a block diagram depicting the virtual network operator (VNO) capabilities within the network management domain, according to exemplary embodiments of the present invention. In accordance with one exemplary embodiment, the NMS 401 may support multiple NMDs (e.g., NMD #1 413 and NMD #2 423), providing each respective VNO (VNO #1 411 and VNO #2 421) with the capability to perform overall network management activities (e.g., configuration, operation and control) and manage network operations (e.g., monitoring network status and statistics, and troubleshooting and maintenance), with respect to only the network components associated with the virtual network controlled by the respective VNO. With regard to the common network equipment/elements 405, each respective VNO is provided with monitor-only access. For example, the VNOs may be provided remote access to its respective NMD with the NMS via a web client (e.g., web clients 415 and 425). Further, a virtual network user classification system may be employed, through which the HNO allocates specific user types for a set of virtual network template types. Then, at the VNO level, specific user-types can then be created based on such template types. Accordingly, via the NMS, an HNO can configure an NMD for a specific VNO, which would provide the VNO with access to its IPGW, IQOS, and associated remote terminals.

Specific NMS management functions at the host network level generally comprise network administration. For example, the HNO configures and maintains the access control database, which includes operator and NMD (VNO-level) conditional access control information (e.g., information for authenticating operators by user ID and password login), and implements operator access restrictions (e.g., monitor, acknowledge, control, configure, and configure override). For example, the NMS may employ a unique conditional access control (CAC) subsystem, to facilitate precise control of traffic. The CAC subsystem would ensure that traffic of one virtual network (or for individual clients within a virtual network) is encrypted and protected from access by clients or operators of other virtual networks. Also, the HNO (e.g., via the NMS) configures the logical separation of the network devices into user-defined domains for the respective virtual networks (e.g., satellite terminals and hub components), and controls NMS resource usage by disconnecting idle sessions and freeing resources.

Then, for network monitoring purposes, according to exemplary embodiments, the NMS also provides various levels of monitoring functionality at both the HNO and the VNO levels. At the host network level, the NMS provides global monitoring features to the HNO. For example, the NMS provides status monitoring functionality to the HNO that facilitates the monitoring of terminal status with respect to the various terminals of each virtual network (e.g., by polling each satellite terminal for status information), and wherein the frequency of status updates (e.g., polling) may be configurable to provide for monitoring of incremental status and topology change information regarding the respective terminal clients. The monitoring functions of the NMS further manage hierarchical groupings of satellite terminals for each NMD/VNO, and also based on various other configurable sort criteria. Further, at the virtual network level, the NMS (e.g., via the respective and NMDs) facilitates the flow down of such monitoring functionality to each VNO. For example, a VNO (via its respective NMD) can monitor the status of the satellite terminals within its virtual network (e.g., by polling each terminal for status information), and again the frequency of such monitoring is configurable to providing criminal status and topology change information regarding the terminal clients of that VNO.

Additionally, for configuration purposes, according to further exemplary embodiments, the NMS similarly provides different levels of configuration functionality at both the HNO and VNO levels. At the host network level, via the NMS, the HNO initially configures all hub devices (e.g., IPGWs) of the network control center, irrespective of whether or not a given hub is to be dedicated to a VNO. With respect each individual virtual network (VNO), the HNO configures an initial set up profiles and service plans for the VNO to serve as templates for further customization by the VNO. Further, the HNO configures the bandwidth for each VNO (e.g., via allocated IPGWs and IQOS plans for a shared VNO model, or via outroutes or dedicated IPGWs and dedicated inroute groups for a dedicated VNO model). Then, at the virtual network level, via the respective NMD, the VNO possesses full configuration control for the satellite terminals that will be subscribed to the network. The VNO further possesses the ability to create new profiles and/or service plans pursuant to access rights granted to the VNO (by the HNO) via the respective NMD.

According to one exemplary embodiment, at a more general level of operation (e.g., irrespective of the network level), the NMS manages one or more configuration databases covering all network elements. At one level, based on an operators privilege level, the operator is afforded permission to add and delete and manage configuration of network elements (e.g., hub components and/or terminal components) within the database. For example, based on HNO configurations, the NMS may organize common sets of configuration parameters into profiles and manages the distribution of such profiles to the different terminals and/or hub components of the host network and/or the allocated virtual networks. Then, on an individual element level, the NMS can generate individual parameter files and parameter profile files for specific hub components and/or terminal components based on configuration parameter and profile information in the database. The individual parameter and profile files are generated at the more general level don't differentiate functionality as between host network and the associated virtual networks. Further, the NMS manages software file versions and distribution of such software to hub components and terminal components of the networks. For tracking and maintenance purposes, the NMS may maintain one or more logs of configuration changes on operator by operator level.

By way of example, the network elements within the provided VNO capabilities and functionality are SNMP manageable (including the hub and satellite terminals), and the NMS supports SNMP-based north bound interface to an external SNMP-based management system, such as SMARTS, HPOV, NetCool, etc. Then, SNMP traps generated by hub and remote VSAT components would be forwarded by the NMS to a configured external SNMP manager used by the respective VNO. In other words, the NMS may support the ability to forward network events (traps/alarms) to other systems further up the network management chain, which may be any of various external management systems that support trap management.

As is evident from the foregoing, the VNO capabilities and functionality of the exemplary embodiments of the present invention provide for various improvements and benefits at both the HNO and the VNO levels. With respect to the HNO, as one example, the HNO possesses flexibility in virtual network configuration and service offerings that can be made available to the VNO. Such flexibility manifests itself, for example, and the ability to provide a complete set of configuration, operational, management and maintenance capabilities to the VNO, as well as the ability to provide for multiple types of VNO configurations (e.g., shared, semi-dedicated, dedicated) and for a customizable user configuration interface. With regard to bandwidth, the HNO is able to provide capacity to a virtual network in terms of dedicated megabits of true bandwidth. Further, to support such dedicated bandwidth, the a virtual network is configured based on a complete partitioning of respective resources for the network. Along with that complete partitioning, the VNO is provided with access to a dedicated NMD for configuration, resource allocation and network management and monitoring. Accordingly, the VNO capabilities and functionality, according to such exemplary embodiments, provides for the leveraging of a complete infrastructure to support multiple VNOs, and streamlined operations for creating and managing the respective virtual networks.

With respect to the VNO, once a virtual network is configured, a robust set of network management functions and tools are flowed down to the VNO. Based on the access control described above, the virtual network operator can log into the respective NMD and work with the associated network partition for the virtual network. Within its assigned capabilities, for example, the virtual network manager or operator can monitor and set thresholds for the network, and configure bandwidth allocation and user access within such thresholds (e.g., the operator can populate the network by adding user accounts associated with respective user terminals and service plans). Also, the network operator can configure access to the NMD for additional network operators. As well, with respect to network configuration capabilities at the VNO level, the network operator may be provided with limited access for modifying certain IPGW settings and IQOS parameters. For example, a VNO may be afforded the capability to modify performance enhancing proxy classification rules and connectivity profiles of the respective IPGW. With respect to IQOS parameters, however, in the case of a shared model, the VNO may be able to monitor or see IQOS configuration parameters that apply to the eye QOS plans of the respective virtual network, but would be prohibited from modifying such parameters. On the other hand, in the case of a dedicated model, the VNO may be afforded the ability to fully configure its own IQOS plans within an inroute group dedicated to the respective virtual network.

Moreover, with respect to element management at the VNO level, the network operator can define profiles, service plans and satellite terminal types to support the user terminals in service plans subscribed to the network. For example, the VNO can be provided with any of a full range of element management capabilities associated with complete service configuration. Such element management capabilities may include the configuration of profiles, service plans, and terminal configuration management. Additionally, the element management capabilities may further include bulk load and bulk migration control, a range of monitoring functions (including real-time trending for allocated resources, detailed drill down with respect to real time statistics, and status monitoring for all devices). Further levels of management capabilities may also be provided, such as alarm management, troubleshooting and diagnostic tools, CSR diagnostic tools, ranging and test carrier functions, detailed statistics and device control, and associated report generation tools. At the VNO level, the operator may additionally be provided with context sensitive help tools and a document library covering various aspects of the respective virtual network.

In accordance with such exemplary embodiments, as depicted in FIG. 2 and FIG. 3, the outroute data is received by a VLAN instance from the respective VNO network 225, and routed through the internal LAN to the Forward Channel Subsystem 205 for transmission over the satellite 132 to the destination satellite terminal(s) of the VNO. More specifically, for example, outroute data is provided, for transmission over the satellite 132 to one or more respective satellite terminals 134, by the VNO network 225a to the respective VLAN 1 of the gateway server #1 (211a). The gateway server/IPGW instance then routes the outroute data via the high-speed internal LAN 213 to the Forward Channel Subsystem 205. Within the Forward Channel Subsystem 205, the satellite Gateway 219 encapsulates, and encodes and modulates, the outroute data for transmission over the satellite 132, and the data is then transmitted via the satellite to respective the destination satellite terminal(s) 134.

Further, as also depicted in FIG. 2, the inroute data is received via the channels of a respective return channel demodulator, and the associated return channel bandwidth manager forward such data over the internal LAN 213 to a respective IPGW/VLAN instance, and then on to the respective VNO network. More specifically, the respective satellite terminals 134 of the VNOs transmit inroute data over the satellite 132 to the NOC 142 via the Forward Channel Subsystem 205. The satellite terminal inroute transmissions are received via respective channels of the respective return channel demodulator 217 (these transmissions are reflected by the dashed lines directly from the satellite terminals 134 to the channels of the return channel demodulator #1, which are shown as dashed lines because in actuality they are indirectly transmitted over the satellite 132). The return channel bandwidth manager #1 in turn manages the received in route transmissions on a logical level based on the configured and allocated IQOS plans. Then, based on information indicating that the received inroute data belongs to a particular IQOS plan of a particular VNO, the return channel bandwidth manager forwards the data over the high-speed internal LAN 213 to the appropriate IPGW/VLAN associated with the respective VNO network 225. For example, the terminal includes its IPGW/VLAN as part of inroute messages received by the return channel bandwidth manager, which then forwards the message to the respective IPGW/VLAN. Alternatively, header information associated with the inroute data (e.g., destination address information) may indicate a destination VNO, and based on internal router tables or other routing information the return channel bandwidth manager can forward the data over the internal network to the respective IPGW/VLAN instance.

Taking things one step further, with respect to the virtual network and the VNO capabilities and features, and accordance with exemplary embodiments, the VNO capabilities facilitates the provision of various levels of service plans and terminal types to the end-user customers of the VNO. For example, in accordance with the features offered through a VNO network, a layer 321 is provided within which the operator is able to throttle bandwidth provided to its customers through various user types configured within the virtual network—such as, service plans (e.g., guaranteed throughput rates or minimum and/or maximum rates) and terminal types (e.g., multiport high throughput enterprise type terminals or lower end consumer terminals). Accordingly, through the respective IPGW/VLAN and IQOS plan (and the associated bandwidth), the virtual network operator maintains broad control over a dedicated level of bandwidth for robust and flexible operations and management within the VNO's business plans. Moreover, the VNO is provided with a robust set of network configuration, operation, management and maintenance tools. In that regard, the VNO capabilities and functionality, according to exemplary embodiments of the present invention, afford significant improvements over prior systems by providing the VNO with a comprehensive set of network configuration, operation and management tools, effectively delivering full control of the virtual network to its operator(s) (virtually segregating the HNO from the business operations of the VNO). For example, among these tools are access to network administration, access control, network monitoring (e.g., real-time network status and performance), remote terminal status monitoring, configuration control (e.g. network, hub and service plan configuration), troubleshooting and diagnostics, network alarm configuration and management, and context sensitive help.

Accordingly, as discussed above with respect to exemplary embodiments of the present invention, the VNO capabilities and functionality provide for various improvements and enhancements over prior networking technologies. For example, the VNO functionality facilitates effective partitioning of network capacity into contain subsets, and provides a clear delineation between host network operator and the customer or virtual network operator roles. The VNO functionality further provides for a robust and extensive VNO operational capability and tool set. The responsibilities of host network operator generally include maintenance and operation of the transmission platform and satellite capacity, and distribution of that capacity across the deployed virtual networks. In that regard, the host network operator must allocate and maintain the contained bandwidth partitions (both inroutes and outroutes) as assigned to the deployed networks, and must establish access controls and configuration separation between the various deployed virtual networks.

At the virtual network level, each VNO is afforded the ability to create individual service plans and configure predefined service-level agreements (SLAs) for the provision of applications and services to its customers. Such service plans and SLAs, however, must fit within the capacity allocated to the VNO (e.g., the outroute capacity of the respective VLAN and the inroute capacity of the respective IQOS plan). Further, in connection with the service plans and SLAs of the VNO, the VNO can offer and configure multiple terminal device types to deliver such service plans to the end-users. With respect to VNO operations, the VNO is provided access to a robust set of tools to monitor the dedicated equipment of its respective virtual network, and to manage and troubleshoot network operations without requiring assistance from the host network operator. Additionally, the VNO functionality and capabilities allow the network operator to oversubscribe its dedicated capacity, to the extent that the VNO maintains its SLAs and desired quality of service within that dedicated capacity.

FIG. 5A illustrates a flow chart depicting a process for configuring and providing VNO capabilities and functionality, in accordance with exemplary embodiments of the present invention. At Step 511, the HNO configures an NMD for a respective VNO, and configures the logical and physical components (e.g., the respective IPGW/VLAN instances within the gateway server, and inroute groups and respective 1005 plans within the return channel bandwidth manager. At step 513, the HNO then configures a virtual network (VN). In that regard, the HNO selects the NMD and selects the respective physical and logical components for the VN (e.g., the respective IPGW/VLAN instance(s) and IQOS plan(s) assigned or dedicated to the VNO, and the associated outroute and inroute bandwidth). The HNO also configures operator classifications for the VN, which establish capabilities for respective VN operator types, and configures one or more operators (each based on an operator classification), and configures operator access to the NMD for the configured operators. As described above, for example, the IPGW/VLAN instance(s) control a fixed level of outroute bandwidth (e.g., in megabits) that is dedicated to the virtual network (out of the total capacity supported by the gateway server 211), and the IQOS plans control a fixed level of inroute bandwidth (e.g., in megabits) that is dedicated to the virtual network (out of the total capacity supported by the inroute group within which the IQOS plan resides). As an optional step, depending on the process employed, the HNO may also configure profiles and service plans for the VNO. Lastly, the HNO configures VNO access to the respective NMD in order for the virtual network operator to access, configure and operate the respective virtual network. Then, at the VNO level, at Step 515, the VN manager (or VNO) accesses the NMD (network partition), and (within its assigned capabilities) the VNO monitors and sets VN thresholds, configures the VN (e.g., adds users/terminals, service plans, etc.), and configures further network operator access rights.

FIG. 5B illustrates a flow chart depicting a further process for configuring and providing VNO capabilities and functionality, in accordance with exemplary embodiments of the present invention. At Step 521, a plurality of network management domains (NMDs) within a network management system (NMS) of a host communications network (HCN) are configured, wherein each NMD is associated with a virtual communications network (VCN) provisioned within the HCN, and wherein the HCN provides outroute and inroute capacity for the VCNs by means of one or more segments of communications spectrum. At step 523, a plurality of outroute capacity partitions are configured via one or more outroute network elements of the HCN, and a plurality of inroute capacity partitions are configured via one or more inroute groups configured within one or more inroute network elements of the HCN, wherein each outroute capacity partition supports a respective level of outroute capacity and each inroute capacity partition supports a respective level of inroute capacity. At Step 525, one or more of the outroute capacity partitions and one or more of the inroute capacity partitions are allocated to a first VCN to provide a fixed level of outroute capacity and a fixed level of inroute capacity to the first VCN. At Step 527, one or more operator classifications within the NMD associated with the first VCN are configured, wherein each operator classification specifies a set of network operator capabilities and permissions allocated to one or more virtual network operators assigned to that classification.

Figure 6:
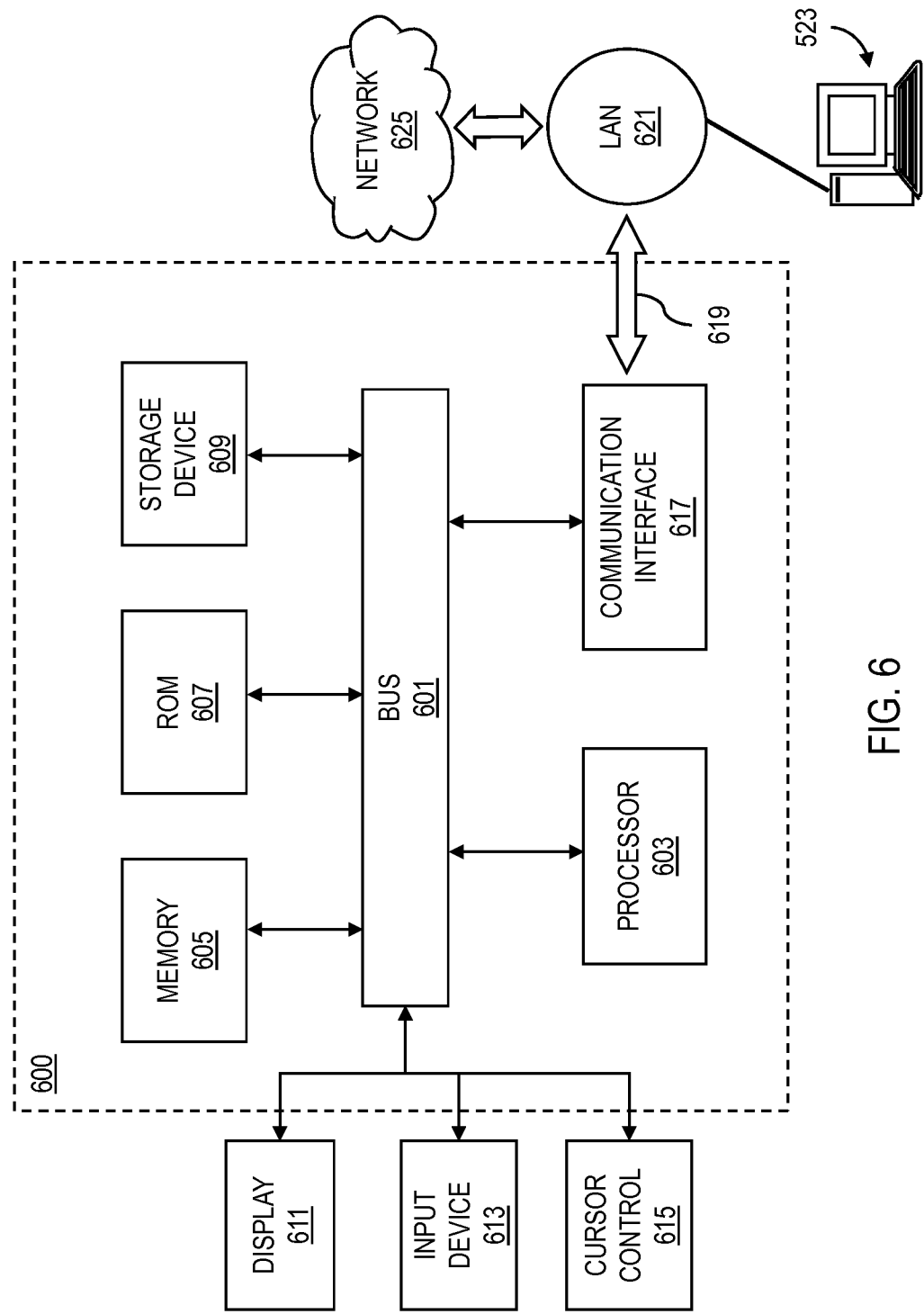
FIG. 6 illustrates a block diagram of a computer system via which a robust and feature-rich virtual network operator (VNO) capability can be implemented, according to exemplary embodiments of the present invention.

FIG. 6 illustrates a block diagram of a computer system via which a robust and feature-rich virtual network operator (VNO) capability can be implemented, according to exemplary embodiments of the present invention. The computer system 600 includes a bus 601 or other communications mechanism for communicating information, and a processor 603 coupled to the bus 601 for processing information. The processor may comprise one or more of various types of general processors, and/or one or more specialized components (not shown), such as the one or more digital signal processors (DSPs) and/or one or more application-specific integrated circuits (ASICs). The computer system 600 also includes main memory 605, such as a random access memory (RAM) or other dynamic storage device, coupled to the bus 601 for storing information and instructions to be executed by the processor 603. Memory 605 can also be used for storing temporary variables or other intermediate information during execution of instructions to be executed by the processor 603. The computer system 600 further includes a read only memory (ROM) 607 or other static storage device coupled to the bus 601 for storing static information and instructions for the processor 603. A storage device 609, such as a magnetic disk or optical disk, is additionally coupled to the bus 601 for storing information and instructions.

The computer system 600 can be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is cursor control 615, such as a mouse, a trackball, or cursor direction keys for communicating direction information and command selections to the processor 603 and for controlling cursor movement on the display 611.

According to aspects of exemplary embodiments of the invention, dynamic and flexible architectures, apparatus and methods for implementing load balancing for traffic loads for multiple priorities, in accordance with exemplary embodiments, are provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement can also be employed to execute the instructions contained in main memory 605. In alternative embodiments, hard-wired circuitry can be used in place of or in combination with software instructions to implement embodiments and aspects of the invention. Thus, embodiments of the present invention are not limited to any specific combination of hardware circuitry and software.

The computer system 600 also includes a communications interface 617 coupled to bus 601. The communications interface 617 provides a two-way data communications, such as coupling to a network link 619 connected to a local network 621 or to or from remote terminals or controllers of communications systems. For example, the communications interface 617 can be a digital subscriber line (DSL) card or modem, an integrated services digital network (ISDN) card, a cable modem, or a telephone modem to provide a data communications connection to a corresponding type of telephone line. As another example, communications interface 617 can be a local area network (LAN) card (e.g., for Ethernet or an Asynchronous Transfer Model (ATM) network) to provide a data communications connection to a compatible LAN. Wireless links, such as for satellite communications systems, can also be implemented. In any such implementation, communications interface 617 sends and receives electrical, electromagnetic, or optical signals that carry digital data streams representing various types of information. Further, the communications interface 617 can include peripheral interface devices, such as a Universal Serial Bus (USB) interface, a PCMCIA (Personal Computer Memory Card International Association) interface, etc.

The network link 619 typically provides data communications through one or more networks to other data devices. For example, the network link 619 can provide a connection through local network 621 to a host computer 623, which has connectivity to a network 625 (e.g., a wide area network (WAN) or the global packet data communications network now commonly referred to as the "Internet") or to data equipment operated by service provider. The local network 621 and network 625 both use electrical, electromagnetic, or optical signals to convey information and instructions. The signals through the various networks and the signals on network link 619 and through communications interface 617, which communicate digital data with computer system 600, are exemplary forms of carrier waves bearing the information and instructions.

The computer system 600 can send messages and receive data, including program code, through the network(s), network link 619, and communications interface 617. In the Internet example, a server (not shown) can transmit requested code belonging to an application program for implementing an embodiment of the present invention through the network 625, local network 621 and communications interface 617. The processor 603 can execute the transmitted code while being received and/or store the code in storage device 609, or other non-volatile storage for later execution. In this manner, computer system 600 can obtain application code in the form of a carrier wave.

The term "computer-readable medium" or "computer-readable media," as used herein, refers to any medium that participates in providing instructions to the processor 603. Such a medium can take many forms, including but not limited to non-volatile media, volatile media, and transmission media. Non-volatile media include, for example read only memory (ROM), included within memory 605 and/or storage device 609. Volatile media may include random access memory or dynamic random access memory (RAM or DRAM), included within memory 605 and/or storage device 609. Transmission media may include copper or other conductive wiring, fiber optics, or other physical transmission media, including the wires and/or optical fiber that comprise bus 601. Transmission media can also take the form of wireless data signals, such as those generated during radio frequency (RF) and infrared (IR) data communications. Common forms of computer-readable media include, for example, magnetic storage media (e.g., magnetic hard disks or any other magnetic storage medium), solid state or semiconductor storage media (e.g., RAM, PROM, EPROM, FLASH EPROM, a data storage device that uses integrated circuit assemblies as memory to store data persistently, or any other storage memory chip or module), optical storage media (e.g., CD ROM, CDRW, DVD, or any other optical storage medium), a or any other medium for storing data from which a computer or processor can read.

Various forms of computer-readable media can be involved in providing instructions to a processor for execution. For example, the instructions for carrying out at least part of the present invention can be stored within the system 600 (e.g., within the storage device 609), or maybe loaded from a local source, such as the host computer 623 vial the LAN 621. Alternatively, the instructions may initially be borne on a magnetic disk of a remote computer, and, for example, delivered via the network 625. In such a scenario, the program instructions would first be loaded into the memory 605 via the communication interface 619 and bus 619. During operation, the processor may then retrieve and execute the program instructions via the bus 601. The instructions received by the memory can optionally be stored on storage device either before or after execution by the processor.

Moreover, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various exemplary embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

While exemplary embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
configuring a plurality of network domains of a host communications network (HCN), wherein each network domain provides a network configuration for a virtual communications network (VCN) provisioned within the HCN for an enterprise customer of the HCN, which provides a virtual communications subnetwork of the HCN from which the enterprise customer can provision communications services for a communications services business, and wherein the HCN provides bandwidth over outroute channels and inroute channels of the HCN for the VCNs;
configuring a plurality of outroute capacity partitions via one or more of the outroute channels of the HCN and configuring a plurality of inroute capacity partitions via one or more inroute groups of the HCN, wherein each inroute group includes one or more of the inroute channels of the HCN, and wherein each outroute capacity partition supports a respective level of outroute bandwidth and each inroute capacity partition supports a respective level of inroute bandwidth;
allocating one or more of the outroute capacity partitions and one or more of the inroute capacity partitions to a first VCN to provision a designated level of the outroute bandwidth and a designated level of the inroute bandwidth to the first VCN; and
configuring one or more operator classifications within the network domain associated with the first VCN, wherein each operator classification specifies a set of network operator capabilities and permissions allocated to one or more virtual network operators assigned to that classification; and
wherein the designated level of outroute bandwidth provisioned to the first VCN via the allocated one or more outroute capacity partitions is provisioned as a level of bandwidth in megabits-per-second (Mbps), and the allocated one or more outroute capacity partitions supports a portion of overall outroute spectrum of the HCN, and wherein the designated level of inroute bandwidth provisioned to the first VCN via the allocated one or more inroute capacity partitions is provisioned as a level of bandwidth in megabits-per-second (Mbps), and the allocated one or more inroute capacity partitions supports a portion of overall inroute spectrum of the HCN.

2. The method of claim 1, wherein:

the outroute channels of the HCN are provided via a gateway server, and the outroute capacity partitions configured via the one or more of the outroute channels are provisioned via at least one respective IP gateway (IPGW) instance, and the one or more inroute groups of the HCN are provided via an inroute bandwidth manager, and the inroute capacity partitions configured via the one or more inroute groups are provisioned via at least one respective inroute quality of service (IQOS) plan.

3. The method of claim 2, wherein the inroute bandwidth manager is associated with an inroute channel demodulator, and inroute transmissions of each of the IQOS plans of the first VCN are received via a respective channel of the inroute channel demodulator.

4. The method of claim 2, wherein at least one of the outroute channels is dedicated to the first VCN to support the designated level of the outroute bandwidth provisioned to the first VCN, and at least one of the inroute groups is dedicated to the first VCN to support the designated level of the inroute bandwidth provisioned to the first VCN.

5. The method of claim 4, wherein:

the at least one outroute channel dedicated to the first VCN each provides a respective portion of the designated level of the outroute bandwidth provisioned to the first VCN; and the at least one inroute group dedicated to the first VCN each provides a respective portion of the designated level of the inroute bandwidth provisioned to the first VCN.

6. The method of claim 5, wherein:

at least one of the operator classifications comprises predetermined levels of configuration control, operational/management control, monitoring capabilities, and troubleshooting/maintenance capabilities allocated to the one or more virtual network operators (VNOs) assigned to that classification; and the one operator classification enables an associated VNO (assigned to that classification) to configure one or more IP gateway (IPGW) instances within the outroute network element(s) dedicated to the first VCN, wherein each IPGW instance facilitates a provision of a fixed level of outroute bandwidth to a respective subnetwork within the first VCN, and enables the associated VNO to configure one or more inroute quality of service (IQOS) plans within the inroute group(s) dedicated to the first VCN, wherein each IQOS plan facilitates a provision of a fixed level of inroute bandwidth to the respective subnetwork within the first VCN.

7. The method of claim 1, wherein at least one of the operator classifications comprises predetermined levels of configuration control, operational/management control, monitoring capabilities, and troubleshooting/maintenance capabilities allocated to the one or more virtual network operators assigned to that classification.

8. A network management system, comprising at least one network operations server including at least one network operations memory device having computer program code stored therein, and at least one network gateway server including at least one network gateway memory device having computer program code stored therein, of a host communications network (HCN); wherein the at least one network operations server together with the at least one network operations memory device and computer program code stored therein, and the at least one network gateway server together with the at least one network gateway memory device and the computer program code stored therein, cause the network management system to:

configure a plurality of network domains within the HCN, wherein each network domain provides a network configuration for a virtual communications network (VCN) provisioned within the HCN for an enterprise customer of the HCN, which provides a virtual communications subnetwork of the HCN from which the enterprise customer can provision communications services for a communications services business, and wherein the HCN provides bandwidth over outroute channels and inroute channels of the HCN for the VCNs;

configure a plurality of outroute capacity partitions via one or more of the outroute channels of the HCN, wherein each outroute capacity partition supports a respective level of outroute bandwidth; and configure a plurality of inroute capacity partitions via one or more inroute groups of the HCN, wherein each inroute group includes one or more of the inroute channels of the HCN, and wherein each inroute capacity partition supports a respective level of inroute bandwidth; and wherein one or more of the outroute capacity partitions and one or more of the inroute capacity partitions are allocated to a first VCN to provision a designated level of the outroute bandwidth and a designated level of the inroute bandwidth to the first VCN;

wherein one or more operator classifications are configured within the network domain associated with the first VCN, wherein each operator classification specifies a set of network operator capabilities and permissions allocated to one or more virtual network operators assigned to that classification;

wherein the designated level of outroute bandwidth provisioned to the first VCN via the allocated one or more outroute capacity partitions is provisioned as a level of bandwidth in megabits-per-second (Mbps), and the allocated one or more outroute capacity partitions supports a portion of overall outroute spectrum of the HCN, and wherein the designated level of inroute bandwidth provisioned to the first VCN via the allocated one or more inroute capacity partitions is provisioned as a level of bandwidth in megabits-per-second (Mbps), and the allocated one or more inroute capacity partitions supports a portion of overall inroute spectrum of the HCN.

9. The network management system of claim 8, wherein:

at least one of the at least one network gateway server is configured to provide the one or more outroute channels of the HCN, and the outroute capacity partitions configured via the one or more of the outroute channels are configured via at least one IP gateway (IPGW) instance of the at least one network gateway server; and the one or more inroute groups of the HCN are provided via an inroute bandwidth manager of the at least one network gateway server, and the inroute capacity partitions configured via the one or more inroute groups are provisioned via at least one respective inroute quality of service (IQOS) plan.

10. The network management system of claim 9, further comprising:
an inroute channel demodulator associated with the inroute bandwidth manager, wherein inroute transmissions of each of the IQOS plan(s) of the first VCN are received via a respective channel of the inroute channel demodulator.

11. The network management system of claim 9, wherein at least one of the outroute channels is dedicated to the first VCN to support the designated level of the outroute bandwidth provisioned to the first VCN, and at least one of the inroute groups is dedicated to the first VCN to support the designated level of the inroute bandwidth provisioned to the VCN.

12. The network management system of claim 11, wherein:
the at least one outroute channel dedicated to the first VCN each provides a respective portion of the designated level of the outroute bandwidth provisioned to the first VCN; and
the at least one inroute group dedicated to the first VCN each provides a respective portion of the designated level of the inroute bandwidth provisioned to the first VCN.

13. The network management system of claim 12, wherein:
at least one of the operator classifications comprises predetermined levels of configuration control, operational/management control, monitoring capabilities, and troubleshooting/maintenance capabilities allocated to the one or more virtual network operators (VNOs) assigned to that classification; and
the one operator classification enables an associated VNO (assigned to that classification) to configure one or more IP gateway (IPGW) instances within the outroute network element(s) dedicated to the first VCN, wherein each IPGW instance facilitates a provision of a fixed level of outroute bandwidth to a respective subnetwork within the first VCN, and enables the associated VNO to configure one or more inroute quality of service (IQOS) plans within the inroute group(s) dedicated to the first VCN, wherein each IQOS plan facilitates a provision of a fixed level of inroute bandwidth to the respective subnetwork within the first VCN.

14. The network management system of claim 8, wherein at least one of the operator classifications comprises predetermined levels of configuration control, operational/management control, monitoring capabilities, and troubleshooting/maintenance capabilities allocated to the one or more virtual network operators assigned to that classification.

* * * * *